UNITED STATES PATENT OFFICE 2,072,101

MANUFACTURE OF ORGANIC COMPOUNDS

Henry Dreyfus, London, England

No Drawing. Application August 25, 1933, Serial No. 686,737. In Great Britain September 1, 1932

6 Claims. (Cl. 260—54)

This invention relates to the manufacture of ethers of glycols, glycerol or other polyhydric alcohols, and particularly to the manufacture of ethers containing two molecules of such hydroxy compounds united by ether linkages at two or more hydroxyl groups.

According to the present invention ethers of glycols, glycerol or other polyhydric alcohols are produced by subjecting the polyhydric alcohols, either in the free state or in the form of alcoholates, to the action of heat preferably in the presence of hydrogen chloride.

It may be remarked that the ethers formed from two molecules of ethylene glycol or two molecules of glycerol in which all the hydroxyl groups have furnished ether linkages, dioxane and diglycerol triether, possess very valuable properties, for example as solvents for organic derivatives of cellulose and that these compounds in particular may be made in a very satisfactory manner by the process of the present invention.

As above indicated the polyhydric alcohols may be employed either as such or in the form of alcoholates such as sodium or calcium alcoholates. In carrying out the process of the invention the hydroxy compound or the alcoholate is heated, preferably in the presence of hydrogen chloride, to a suitable temperature and the ether formed may then be removed from the heating zone, for example by distillation through a column, the top of which is maintained at such a temperature that any hydroxy compound vapour is returned to the reaction zone, while the ether remains uncondensed.

The invention is not limited as regards the temperature at which the process is carried out, but preferably temperatures not substantially less than the boiling point, under the pressure obtaining, of the ether to be produced are employed, and usually it is found advantageous to use considerably higher temperatures. Thus in the manufacture of dioxane from ethylene glycol according to the invention, temperatures about 100° C., and especially between about 150° and 200° C., are very suitable, while for making diglycerol triether from glycerol temperatures above 170° C. and especially between 220° and 300° C. are most advantageous. It is usually preferable to work under atmospheric pressure, although higher pressures or pressures less than atmospheric may be employed if desired.

In producing the ethers, glycol or glycerol, for example, may be heated to a suitable temperature such as those above indicated in any convenient form of apparatus, and dry hydrogen chloride gas passed through the liquid, preferably under conditions such that as intimate a mixture as possible between the glycol or glycerol and the gas is obtained. For example, the hydrogen chloride may be introduced in the form of fine bubbles such as may be produced by forcing the gas through a porous plate, and at the same time the liquid may be thoroughly stirred or otherwise agitated. Advantageously the ether may be removed from the reaction zone in the form of vapour as fast as it is formed, together with the escaping water vapour and hydrogen chloride gas, from which it may afterwards be separated in any convenient way.

If desired, other substances having a catalytic or condensing action may be employed, either alone or in association with each other and/or with hydrogen chloride. Thus, for example, hydrogen chloride may be passed through glycol or glycerol containing calcium chloride or other suitable condensing agent in suspension, and heated to the desired temperature.

The polyhydric alcohols as such or in the form of alcoholates may be employed in solution in or otherwise in association with inert solvents or diluents such as tetrahydronaphthalene, thereby enabling a more regular and efficient heating to be obtained. Moreover, the condensation may be effected in presence of a substance capable of forming an azeotropic mixture with the ether, whereby the separation of the latter from the parent hydroxy compound and/or the inert solvent or diluent is facilitated. If desired, the solvent or diluent itself may be capable of entraining the ether, yielding a mixture free from the hydroxy compound from which the ether may subsequently be separated in any convenient way.

To aid in separating from the ether the water formed in the reaction, or any water initially present in admixture with the hydroxy compound, a substance capable of forming an azeotropic mixture with water may be employed. Such substances may be initially present with the hydroxy compound to be subjected to the reaction, or, for instance, they may be added to the vapour mixture leaving the reaction zone, preferably before any condensation has taken place. Advantageously they may be present in amount sufficient to produce an azeotropic mixture with all the water present, thus enabling the ether to be separated, for example by fractional condensation, in an almost completely anhydrous state.

Alternatively the reaction may be effected under such conditions that the ether formed is continually returned to the reaction zone, while the water vapour, with or without an entraining liquid, is allowed to escape. Such separation may conveniently be effected in a fractionating column containing, for example, Raschig rings.

When it is desired to employ the polyhydric alcohols in the form of alcoholates, preferably alkali or alkaline earth alcoholates, are used such as the sodium or calcium alcoholate of, for example, glycerol. By heating such an alcoholate in an atmosphere comprising hydrogen chloride gas the ethers, including diglycerol triether in the case of a glycerol alcoholate, may be produced. Suitable temperatures are, for example, temperatures above 160° C., and especially between 180° and 200° C., although higher temperatures may be employed if desired. Advantageously, the reaction is effected under pressures not substantially exceeding atmospheric, while if desired lower pressures, for example between ¼ and 1 atmosphere, may be employed.

Although the use of an atmosphere comprising hydrogen chloride is to be preferred, in that, inter alia, it enables somewhat lower temperatures to be employed, the invention is not restricted to such use, and the decomposition of the alcoholate to give the ether may be effected by simple heating, preferably in an inert atmosphere comprising, for instance, nitrogen or carbon dioxide or in an atmosphere comprising both such an inert gas and hydrogen chloride.

Further, the alcoholates may very conveniently be heated, whether or not hydrogen chloride or other catalyst be employed, in solution or suspension in or otherwise in presence of an inert liquid of high boiling point, such as tetrahydronaphthalene, decahydronaphthalene, diphenyl, or the like. As described above, the reaction may be effected in the presence of substances having an entraining action on either the ether or water, or in the presence of both types of substance. Preferably the solution or suspension is thoroughly stirred or otherwise agitated, and intimate contact with the hydrogen chloride may further be promoted by leading the gas into the reaction mixture in the form of very fine bubbles. If desired the agitation of the liquid may be aided by the passage of other gases or vapours, such as nitrogen or carbon dioxide, therethrough, whether or not hydrogen chloride is employed.

When producing ethers by the above method, instead of the alcoholates of polyhydric alcohols mixtures of metal oxides, and preferably alkali metal or alkaline earth metal oxides, and the polyhydric alcohols may be employed. For example a mixture of glycerine and calcium oxide may be heated to a suitable temperature and fresh glycerine run into the mixture as the ether distils off. The quantity of oxide employed in such a process may be equal to less than or more than that theoretically necessary to form the salt of the polyhydric alcohol.

Although the use of azeotroping substances for the separation of water from the ethers has been specifically described, such removal may be effected in any other convenient way, either before or after condensation of both the ethers and water or of the ethers alone. Thus the vapours leaving the reaction zone may be led into or otherwise treated with a liquid at a temperature between the boiling points of water and the ether; preferably such liquid may be substantially immiscible with the ether, thus facilitating the subsequent separation of ether from condensing liquid. Again, the reaction vapours may be treated with a liquid having a solvent action on the ether and substantially none on the water, or the ether may be passed over or treated with water binding substances, preferably after separation, as by fractional condensation, of the greater part of the water. Any other convenient method may, however, be employed.

Even after separation from the water, the ethers may still contain hydrogen chloride, which may be removed in any convenient way. Thus the vapours issuing from the reaction zone, before the separation of the water, may be passed over or otherwise in contact with a neutralizing agent such as sodium carbonate or calcium hydroxide. If desired, however, neutralization may take place after condensation of the ethers or thoroughly stirred or otherwise agitated, and in of both ethers and water. Preferably, however, the water is first separated as described above, together with much of the hydrogen chloride, and the condensed ethers subsequently treated with a neutralizing agent. The ethers may be separated from the chlorides formed and/or excess of the neutralizing agent in any convenient way, for example by centrifuging or by distillation.

Any water present in the products of reaction may be removed in any convenient manner, as, for example, by fractional condensation, with or without the use of an entraining liquid therefor. If the decomposition of the polyhydric alcohol, as such or in the form of an alcoholate, is effected under conditions of temperature and pressure such that the ether does not distil off continuously, the water may be continuously removed by distillation, if desired, in the form of an azeotropic mixture with any suitable substance.

The ether may be separated from the solvent or diluent, if such is employed, for example with the aid of an entraining substance, or by fractional distillation, or in any other way.

The following examples illustrate the invention, but are not to be considered as limiting it in any way:—

*Example 1*

Glycerol is heated in a vessel provided with stirrers and an outlet connected to the lower part of a fractionating column, the upper part of which is maintained at about 110–120° C.

When the temperature attains 250–260° C. hydrogen chloride is fed in through a distributor immersed in the glycerol whilst the latter is subjected to rapid stirring.

The reaction products distil off and fresh glycerol is continuously supplied to the vessel. Water produced in the reaction passes uncondensed through the fractionating column together with hydrogen chloride, whilst the glycerol ether together with by-products and unchanged glycerol are condensed. The condensate is run into a receiver containing sodium carbonate, after which the acid free product may be subjected to a treatment e. g. distillation and/or solvent extraction to purify the ether.

*Example 2*

A mixture of about equal parts by weight of calcium glycerate and diphenyl is heated slowly in a vessel provided with stirrers and an outlet connected to a condenser leading to a receiver.

When the diphenyl melts the temperature is rapidly raised to 190–200° C. whilst stirring and hydrogen chloride is passed into the mixture in the form of small bubbles by means of a distributor immersed in it.

The reaction products are condensed and collected in the receiver, uncondensed hydrogen chloride being returned to the process. After neutralization with sodium carbonate, the ether produced can be separated by distillation and/or extraction with solvents.

*Example 3*

A fluid mixture of calcium glycerate and glycerol is subjected whilst stirring to dry distillation at a temperature of 240–280° C. and the ether evolved together with by-products is condensed and worked up as described in the preceding examples.

Although the invention has been described specifically with respect to the manufacture of dioxane and diglycerol triether from glycol and glycerol respectively, it may also be applied to any similar or homologous di- or poly-ethers. Thus, for example, erythritol or other polyhydroxy compounds or mono- or other ethers thereof containing at least two free hydroxyl groups may be converted into the corresponding ethers. Moreover, the invention is not confined to the production of symmetrical ethers; thus, for example, by using a mixture of glycol and glycerol, or glycol and an α-ether of glycerol, hydroxy methyl dioxane or ethers thereof may be obtained, or by employing glycol and a β-ether of glycerol, a compound containing a 7-membered ring may be obtained. Again, instead of employing only polyhydric alcohols such compounds may be employed together with, for example, formaldehyde, acetaldehyde, acetone or homologues thereof, and the like, so as to produce products of condensation between the formaldehyde etc. and the polyhydric alcohols as well as the polyhydric alcohol-ethers. By this means mixtures having very valuable solvent powers may be produced.

What I claim and desire to secure by Letters Patent is:—

1. Process for the manufacture of cyclic ethers, which comprises subjecting a glycol to the action of temperatures between 150 and 200° C. in the presence of hydrogen chloride.

2. Process for the manufacture of dioxane, which comprises subjecting ethylene glycol to temperatures between 150 and 200° C. in the presence of hydrogen chloride.

3. Process for the manufacture of cyclic ethers, which comprises subjecting polyhydric alcohols to condensation under the action of heat and the catalytic influence of hydrogen chloride at temperatures above 150° C.

4. Process for the manufacture of a cyclic ether, which comprises subjecting glycerine to condensation under the action of heat and the catalytic influence of hydrogen chloride at temperatures above 170° C.

5. Process for the manufacture of a cyclic ether, which comprises subjecting glycerine to condensation under the action of heat and the catalytic influence of hydrogen chloride at temperatures of 220 to 300° C.

6. Process for the manufacture of a cyclic ether, which comprises subjecting glycerine to condensation under the action of heat and the catalytic influence of hydrogen chloride at temperatures of 220 to 300° C. while in admixture with an inert diluent.

HENRY DREYFUS.

CERTIFICATE OF CORRECTION.

Patent No. 2,072,101. March 2, 1937.

HENRY DREYFUS.

It is hereby certified that error appears in the printed specification of the above numbered patent requiring correction as follows: Page 2, second column, line 19, strike out the words and syllable "thoroughly stirred or otherwise agitated and in-" and line 20, before "ethers" insert the; and that the said Letters Patent should be read with these corrections therein that the same may conform to the record of the case in the Patent Office.

Signed and sealed this 30th day of March, A. D. 1937.

(Seal)

Henry Van Arsdale
Acting Commissioner of Patents.